United States Patent [19]

Maruyama et al.

[11] Patent Number: 4,969,145
[45] Date of Patent: Nov. 6, 1990

[54] MODEM

[75] Inventors: Junji Maruyama, Tokyo; Masahiro Fukutomi, Nagoya, both of Japan

[73] Assignee: Oki Electric Industry Co., Ltd., Tokyo, Japan

[21] Appl. No.: 254,684

[22] Filed: Oct. 7, 1988

[30] Foreign Application Priority Data

Oct. 8, 1987 [JP] Japan .................. 62-252537

[51] Int. Cl.⁵ .............................................. H04B 3/23
[52] U.S. Cl. ........................................ 370/32.1; 375/8; 375/98
[58] Field of Search ............... 455/249, 250, 235, 205, 455/223; 370/32.1, 32; 375/98, 8

[56] References Cited

U.S. PATENT DOCUMENTS

| | | | |
|---|---|---|---|
| 1,904,567 | 4/1933 | Taylor | 370/32 |
| 1,921,063 | 8/1933 | Affel | 379/410 |
| 3,860,768 | 1/1975 | Wehrmann | 379/410 |
| 4,029,912 | 6/1977 | Geigel et al. | 370/32.1 |
| 4,064,379 | 12/1977 | Horna | 374/411 |
| 4,531,234 | 7/1985 | Bell | 455/250 |
| 4,561,113 | 12/1985 | Naito | 455/205 |
| 4,764,955 | 8/1988 | Galand | 379/411 |
| 4,811,423 | 3/1989 | Eastmond | 455/235 |

*Primary Examiner*—Jin F. Ng
*Assistant Examiner*—Randall Vaas
*Attorney, Agent, or Firm*—Wenderoth, Lind & Ponack

[57] ABSTRACT

A modem detects the received signal level at the start of communication and inserts an attenuator in the received input circuit if the level is too high. This arrangement extends the dynamic range of the modem without requiring a complex demodulating circuit.

16 Claims, 2 Drawing Sheets

1

MODEM

BACKGROUND OF THE INVENTION

This invention relates to a modem generally, and more particularly to a modem with a circuit for extending its dynamic range.

At present, data communication relies almost entirely on the network of telephone lines. The frequency bandwidth, attenuation distortion, delay distortion, signal-to-noise ratio, and other characteristics of the telephone lines are optimized for carrying voice conversations and are not suited for carrying data signals. Accordingly, in data communication via telephone lines, the transmitting terminal must convert the data signal by using it to modulate a carrier signal compatible with the line characteristics, and the receiving terminal must demodulate the received signal to recreate the original data signal. These modulating and demodulating functions are usually performed by a modem, which is a device inserted between the data terminal equipment and the telephone line. In a system that transmits a variety of types of data or communicates with a variety of terminals, it is necessary for the modem to be able to operate under a wide range of received signal levels; that is, the modem must have a wide dynamic range.

A problem of prior-art modems is that the dynamic range of the modem is at most equal to the dynamic range of its demodulating circuit. To widen the dynamic range of the modem it is therefore necessary to widen the dynamic range of the demodulating circuit, but this is difficult and expensive; that is, it requires a complex circuit configuration making use of advanced technology.

SUMMARY OF THE INVENTION

An object of this invention is to provide a modem having a wide dynamic range without requiring a complex demodulating circuit. To attain this object, a modem according to this invention comprises at least an attenuator or amplifier for attenuating or amplifying the received signal, level decision circuit for determining the received signal level (e.g., at the beginning of a communication), a switch for selecting either the output of the attenuator or amplifier, or the unmodified received signal according to the determination made by the level decision circuit, and a demodulating circuit for demodulating the signal selected by the switch.

DETAILED DESCRIPTION OF THE EMBODIMENTS

An embodiment of this invention will be described with reference to the drawings.

Figure 1:
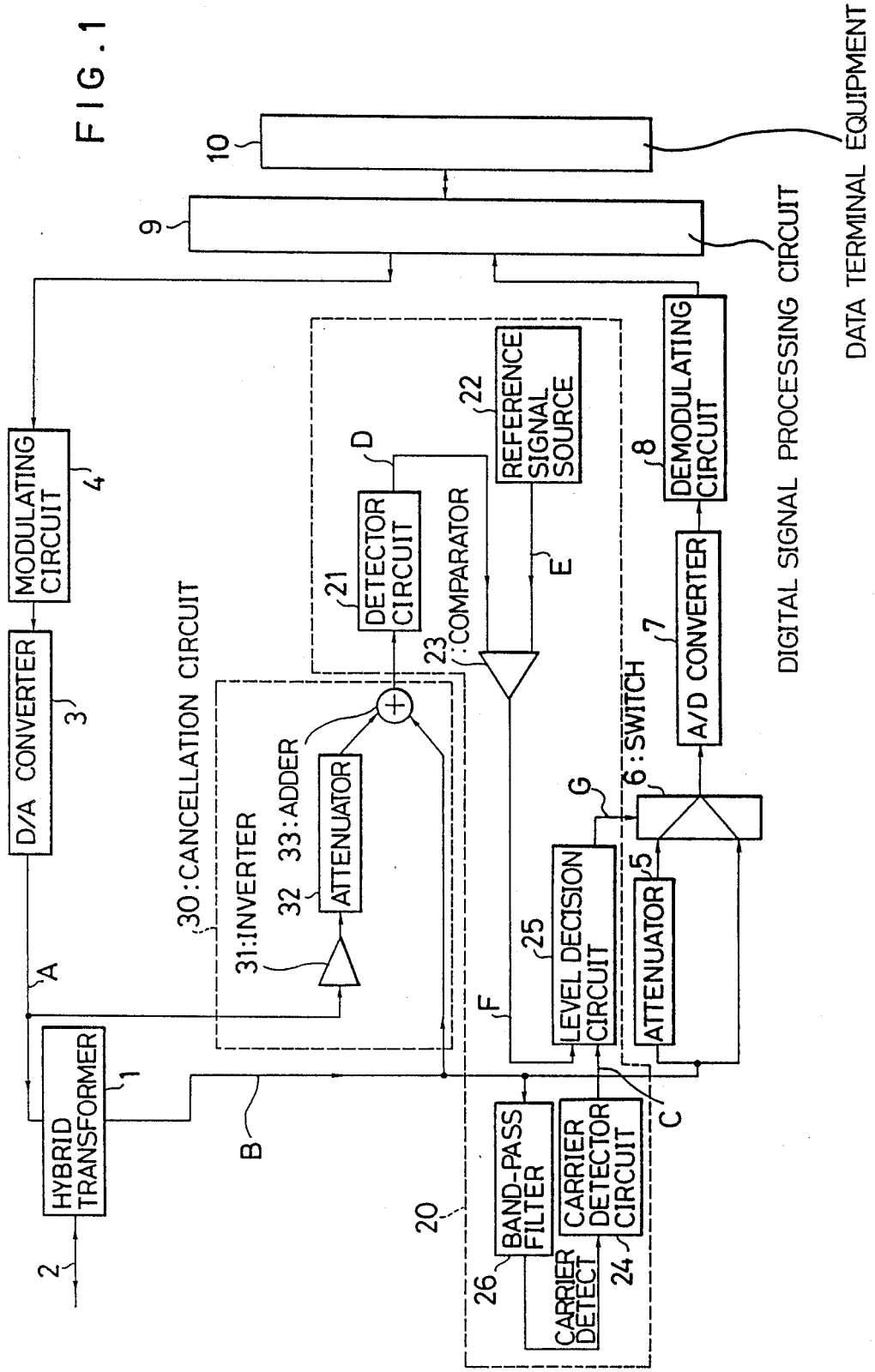
FIG. 1 is a block diagram of an embodiment of the present invention.

FIG. 1 is a block diagram of a modem according to this embodiment. The modem comprises a hybrid transformer 1 connected to a two-wire communication line 2 such as a telephone subscriber circuit, a digital-to-analog (D/A) converter 3, a modulating circuit 4 which modualtes a carrier signal and sends the resulting transmitted signal A to the communication line 2 via the D/A converter 3 and the hybrid transformer 1, an attenuator 5 which attenuates the received signal B received from the communication line 2 via the hybrid transformer 1, a switch 6 for selecting either the output of the attenuator 5 of the unattenuated received signal B, an analog-to-digital (A/D) converter 7, and a demodulating circuit 8 which demodulates the signal selected by the switch 6. The modulating circuit 4 and the demodulating circuit 8 are connected to a digital signal-processing circuit 9, which includes filters and amplifiers, and interfaces to the data terminal equipment 10 served by the modem.

In addition, the modem comprises a level decision circuit 20 and a cancellation circuit 30. The level decision circuit 20 comprises a detector circuit 21, a reference signal source 22 for generating a constant-level reference signal E, a comparator 23 that receives and compares the outputs of the detector circuit 21 and reference signal source 22 to generate a digital comparator output signal F, a carrier detector circuit 24 that is connected via a band-pass filter 26 to the line conducting the received signal B and generates a carrier detect signal C, and a level decision circuit 25 that receives the comparator output signal F and the carrier detect signal C, and determines whether the proportion of this interval during which the comparator output signal F is High is equal to or greater than a certain threshold value and generates a decision output signal G reflecting the result of the determination. The cancellation circuit 30 comprises an inverter 31 that receives the transmitted signal A, an attenuator 32 that attenuates the output of the inverter 31, and an adder 33 that adds the output of the attenuator 32 and the received signal B and supplies their sum to the detector circuit 21.

Next the operation of this embodiment will be explained.

This modem is a full-duplex modem, and can transmit and receive simultaneously. The purpose of the hybrid transformer 1 is to interface the communication line 2 to both the transmitted signal A and the received signal B while preventing interference between these two signals. However, interference cannot be entirely prevented; a certain amount of the transmitted signal A leaks through into the received signal B. The purpose of the cancellation circuit 30 is to cancel the effects of this leakage. The inverter 31 receives the transmitted signal A from the D/A converter 3 and inverts it by shifting its phase through 180°. The attenuator 32 attenuates the inverter transmitted signal, preferably to a level substantially equal to the level of transmitted signal leakage into the received signal B. The adder 33 adds the resulting inverted and attenuated transmitted signal to the received signal B from the hybrid transformer 1. The output of the adder 33 is a received signal from which the leakage of the transmitted signal A has been substantially eliminated.

Figure 2:
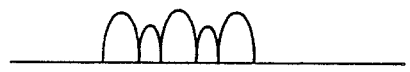
FIG. 2 illustrates the detector output D in FIG. 1.
Figure 3:
FIG. 3 illustrates the comparator output F in FIG. 1.

The detector circuit 21 rectifies the signal output from the adder 33, producing a detected signal D with a waveform like that shown in FIG. 2. The comparator 23 digitizes the detected signal D by comparing it with a reference signal E, which it receives from the reference signal source 22, thus converting the detected signal D to a digital output signal F as shown in FIG. 3, which is supplied to the level decision circuit 25.

The level decision circuit 25 also receives from the carrier detector circuit 24 a carrier detect signal C which can be in the on state, indicating that the carrier level of the received signal is within the range receivable by the modem, or the off state, indicating that the carrier level of the received signal is not within this range. The level decision circuit 25 monitors the comparator output signal F for a certain interval after an off-to-on transition of the carrier detect signal C, and determines whether the proportion of this interval during which the comparator output signal F is High is equal to or greater than a certain threshold value. The interval during which the level decision circuit 25 monitors the output of the comparator 23 should preferably be short enough that the level decision made by the level decision circuit 25 is unlikely to be affected by line noise occurring after communication starts. Once the level decision has been made it is indicated by a decision output signal G from the level decision circuit 25, which is held constant until the carrier detect signal C reverts to the off state.

The decision output signal G controls the switch 6. If the decision output signal G indicates that the comparator output signal F was High for more than the threshold value, the switch 6 connects the demodulating circuit 8 to the attenuator 5, so that the received signal B is attenuated by the attenuator 5 before it reaches the demodulating circuit 8. If the decision output signal G indicates that the comparator output signal F was not High for more than the threshold value, the switch 6 connects the demodulating circuit 8 directly to the hybrid transformer 1, so that it receives the unattenuated received signal B.

The effect of switching the attenuator 5 in or out of the input path according to the level of the received signal B from which the transmit component has been removed is that the dynamic range of the modem can be wider than the dynamic range of the demodulating circuit 8. Accordingly, this invention provides a simple and inexpensive way to manufacture a high-performance modem.

The scope of this invention is not limited to the embodiment shown in the drawings, but also encompasses many variations and modifications which will be obvious to one skilled in the art. For example, an amplifier can be used in place of the attenuator 5, and the operation of the switch 6 can be reversed so that if the level of the received signal B is low, it is amplified before being supplied to the demodulating circuit 8. This invention can also be applied in a half-duplex modem which transmits and receives during separate time intervals, or in a simplex modem having only a receive function. In these cases the circuit elements for removing transmitted signal leakage from the received signal B can be eliminated.

What is claimed is:

1. A modem for receiving and demodulating a received signal from a communication line, comprising:
   a level varying means for receiving and varying a level of said received signal;
   a level decision means for determining whether a level of said received signal exceeds a predetermined constant level;
   a switch for selecting either said received signal or an output of said level varying means, according to a determination made by said level decision means; and
   a demodulating circuit for demodulating the signal selected by said switch;
   wherein said level decision means comprises:
   a detector circuit for rectifying said received signal;
   a reference-signal source for generating a reference signal of a constant level;
   a comparator for digitizing an output of said detector circuit by comparing it with said reference signal; and
   a level decision circuit for receiving an output of said comparator, monitoring the level of said output of said comparator, determining a level of said received signal on the basis of whether the proportion of an interval during which said output is high is longer than a predetermined threshold value, and then sending a decision output signal to said switch.

2. A modem according to claim 1, further comprising a carrier detect circuit for generating a carrier detect signal in accordance with a presence of a carrier signal in said received signal, wherein said level decision circuit receives said carrier detect signal, monitors the level of said output of said comparator for a certain interval after it first detects said carrier signal, and holds said decision output signal unchanged as long as it continues to detect said carrier signal.

3. A modem according to claim 1, further comprising:
   a modulating circuit for modulating a transmitted signal;
   a hybrid transformer for interfacing said received signal and said transmitted signal to said communication line;
   a leakage cancellation means for canceling leakage of said transmitted signal in said received signal for said received signal is supplied to said level decision means.

4. A modem according to claim 1, further comprising a hybrid transformer for interfacing said received signal and a transmitted signal to said communication line, wherein said level varying means receives said received signal through said hybrid transformer.

5. A modem according to claim 1, wherein said level varying means comprises an attenuator and said switch selects an output of said attenuator when a level of said received signal is higher than said predetermined constant level, and selects said received signal when said level of said received signal is lower than said predetermined constant level.

6. A modem according to claim 1, wherein said level decision means determines the level of said received signal at the beginning of communication.

7. A modem for receiving and demodulating a received signal from a communication line, comprising:
   a level varying means for receiving and varying a level of said received signal;
   a level decision means for determining whether a level of said received signal exceeds a predetermined constant level;
   a switch for selecting either said received signal or an output of said level varying means, according to a determination made by said level decision means; and
   a demodulating circuit for demodulating the signal selected by said switch;
   further comprising:
   a modulating circuit for modulating a transmitted signal;
   a hybrid transformer for interfacing said received signal and said transmitted signal to said communication line;
   a leakage cancellation means for canceling leakage of said transmitted signal in said received signal before said received signal is supplied to said level decision means;

wherein said cancellation means comprises:
an inverter for receiving and inverting said transmitted signal;
an attenuator for attenuating an output of said inverter; and
a summing amplifier for adding an output of said attenuator to said received signal and for supplying their sum to said level decision means.

8. A modem for receiving and demodulating a received signal from a communication line, comprising:
a level varying means for receiving and varying a level of said received signal;
a level decision means for determining whether a level of said received signal exceeds a predetermined constant level;
a switch for selecting either said received signal or an output of said level varying means, according to a determination made by said level decision means; and
a demodulating circuit for demodulating the signal selected by said switch;
wherein said level decision means determines the level of said received signal at a beginning of a communication; and
wherein said switch keeps selecting either said received signal or said output of said level varying means until an end of said communication, according to the determination made by said level decision means at the time of said beginning of said communication.

9. A modem according to claim 8, wherein said level decision means determines the level of said received signal before an actual transmission of data of the communication begins.

10. A modem according to claim 8, further comprising a carrier detect circuit for generating a carrier detect signal in accordance with a detection of a presence of a carrier signal in said received signal, wherein said level decision means receives said carrier detect signal, and determines the level of the received signal upon a detection of an off-to-on transition of said carrier detect signal, and holds said decision output as long as it continues to detect said carrier signal.

11. A modem according to claim 8, wherein said level decision means comprises:
a detector circuit for rectifying said received signal;
a reference-signal source for generating a reference signal of a constant level;
a comparator for digitizing an output of said detector circuit by comparing it with said reference signal; and
a level decision circuit for receiving an output of said comparator, monitoring the level of said output of said comparator, determining a level of said received signal on the basis of whether the proportion of an interval during which said output is high is longer than a predetermined threshold value, and then sending a decision output signal to said switch.

12. A modem according to claim 8, further comprising:
a modulating circuit for modulating a transmitted signal;
a hybrid transformer for interfacing said received signal and said transmitted signal to said communication line;
a leakage cancellation means for cancelling leakage of said transmitted signal in said received signal before said received signal is supplied to said level decision means.

13. A modem according to claim 12, wherein said cancellation means comprises:
an inverter for receiving and inverting said transmitted signal;
an attenuator for attenuating an output of said inverter; and
a summing amplifier for adding an output of said attenuator to said received signal and for supplying their sum to said level decision means.

14. A modem according to claim 8, wherein said level varying means comprises an attenuator.

15. A modem according to claim 8, further comprising a hybrid transformer for interfacing said received signal and a transmitted signal to said communication line, wherein said level varying means receives said received signal through said hybrid transformer.

16. A modem according to claim 13, wherein said level varying means receives said received signal through said hybrid transformer.

* * * * *